US012120757B2

(12) United States Patent
Seo et al.

(10) Patent No.: US 12,120,757 B2
(45) Date of Patent: Oct. 15, 2024

(54) ELECTRONIC DEVICE AND CONTROL METHOD THEREFOR

(71) Applicant: SAMSUNG ELECTRONICS CO., LTD., Suwon-si (KR)

(72) Inventors: Jehwan Seo, Suwon-si (KR); Yongjin Kang, Suwon-si (KR); Geunsam Yang, Suwon-si (KR); Sanggi Oh, Suwon-si (KR); Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 17/434,276

(22) PCT Filed: Jun. 14, 2021

(86) PCT No.: PCT/KR2021/007396
§ 371 (c)(1),
(2) Date: Aug. 26, 2021

(87) PCT Pub. No.: WO2022/025420
PCT Pub. Date: Feb. 3, 2022

(65) Prior Publication Data
US 2023/0164856 A1 May 25, 2023

(30) Foreign Application Priority Data
Jul. 30, 2020 (KR) .................. 10-2020-0095088
Mar. 23, 2021 (KR) .................. 10-2021-0037430

(51) Int. Cl.
*H04W 76/00* (2018.01)
*H04W 76/14* (2018.01)
(Continued)

(52) U.S. Cl.
CPC .......... *H04W 76/14* (2018.02); *H04W 76/15* (2018.02); *H04W 76/30* (2018.02)

(58) Field of Classification Search
CPC combination set(s) only.
See application file for complete search history.

(56) References Cited

U.S. PATENT DOCUMENTS 9,265,080 B1 * 2/2016 Palin .................. H04W 76/15
10,206,039 B1   2/2019 Yun et al.
(Continued)

FOREIGN PATENT DOCUMENTS

KR      10-1436760 B1    9/2014
KR      10-1528466 B1    6/2015
(Continued)

OTHER PUBLICATIONS

International Search Report & Written Opinion (PCT/ISA/210 & PCT/ISA/237) issued Sep. 24, 2021 by the International searching Authority in International Application No. PCT/KR2021/007396.

*Primary Examiner* — Md K Talukder
(74) *Attorney, Agent, or Firm* — Sughrue Mion, PLLC

(57) ABSTRACT

An electronic device is provided. The electronic device identifies, in a state paired with a first external device providing content data, an occurrence of event for pairing with a second external device; releases the pairing with the first external device and performs the pairing with the second external device; sets up the electronic device as a primary device for pairing with the first external device; transmits information about the primary device to the first external device to perform the pairing with the first external device; and based on the content data received form the first external device, outputs content and transmits the content data to the second external device.

20 Claims, 10 Drawing Sheets

(51) Int. Cl.
*H04W 76/15* (2018.01)
*H04W 76/30* (2018.01)

(56) References Cited

U.S. PATENT DOCUMENTS

| | | | |
|---|---|---|---|
| 10,524,300 B2 | 12/2019 | Ueda et al. | |
| 11,758,396 B2* | 9/2023 | Barr | H04L 9/3271 |
| | | | 726/2 |
| 2012/0084446 A1* | 4/2012 | Iinuma | H04W 36/0079 |
| | | | 709/227 |
| 2012/0302170 A1* | 11/2012 | Frazier | H04W 84/20 |
| | | | 455/41.3 |
| 2014/0025744 A1* | 1/2014 | Kim | H04L 65/403 |
| | | | 709/204 |
| 2014/0274173 A1* | 9/2014 | Dharawat | H04W 76/23 |
| | | | 455/500 |
| 2016/0345367 A1* | 11/2016 | Nakayama | H04N 23/661 |
| 2017/0235461 A1* | 8/2017 | Oh | G06F 3/167 |
| | | | 715/716 |
| 2017/0272270 A1* | 9/2017 | Gu | H04B 17/318 |
| 2019/0089925 A1* | 3/2019 | Lee | H04N 5/642 |
| 2019/0104396 A1* | 4/2019 | Yu | H04W 12/04 |
| 2019/0174557 A1 | 6/2019 | Ueda et al. | |
| 2020/0252993 A1* | 8/2020 | Srivastava | H04W 36/30 |
| 2021/0068194 A1 | 3/2021 | Han et al. | |
| 2021/0180821 A1* | 6/2021 | Cha | F24F 11/30 |
| 2022/0210853 A1* | 6/2022 | Nallatamby | H04W 76/15 |
| 2023/0164856 A1* | 5/2023 | Seo | H04W 84/20 |
| | | | 455/500 |

FOREIGN PATENT DOCUMENTS

| | | |
|---|---|---|
| KR | 10-2017-0062853 A | 6/2017 |
| KR | 10-2019-0016802 A | 2/2019 |
| KR | 10-2019-0084584 A | 7/2019 |

* cited by examiner

ELECTRONIC DEVICE AND CONTROL METHOD THEREFOR

TECHNICAL FIELD

The disclosure relates to an electronic device and a control method thereof, and more particularly, to an electronic device with multi-point pairing capabilities, and a control method thereof.

BACKGROUND ART

With recent technological advances, it has become easier to connect between electronic devices, and as such, multi-point pairing is becoming more common. The multi-point pairing is a process in which one electronic device pairs with a plurality of other electronic devices at the same time. For example, a Bluetooth® enabled device may be paired with a source device to output an audio of the source device, but a new Bluetooth® enabled device may be further paired with an existing Bluetooth® enabled device to output the audio of the source device together with the existing Bluetooth® enabled device. The Bluetooth® enabled device being paired with the source device may be referred to single point pairing, and the new Bluetooth® enabled device paired with the existing Bluetooth® enabled device and the source device together may be referred to multi-point pairing. According to such a multi-point pairing, the audio of the source device may be output by channel, and therefore sense of realism, ambience, immersiveness and so on may be improved compared with the single point pairing.

However, in the multi-point pairing technology, since the existing Bluetooth® device, which is paired with the source device, first disconnects the pairing with the source device and then attempts the pairing with the new Bluetooth® device, the related art pairing requires a process, in which, after pairing with the new Bluetooth® device, any one set up as a primary device among the two Bluetooth® devices should be paired with the source device.

For example, if the source device is a television (TV), even though the existing Bluetooth® device, which has disconnected the pairing with the source device, has been paired with the new Bluetooth® device, a troublesome procedure is required, in which, a user searches for Bluetooth® devices connectable through the TV and identifies and selects any one among the searched Bluetooth® devices as the primary device. Thus, user's convenience for the multi-point pairing is reduced.

Accordingly, a method, which can minimize user's intervention during the multi-point pairing, thereby improving the user's convenience for the multi-point pairing, is required.

DISCLOSURE

Technical Problem

The present disclosure provides an electronic device, which can minimize user's intervention during a multi-point pairing, thereby improving user's convenience for the multi-point pairing, and a control method thereof.

Technical Solution

According to an aspect of the disclosure, there is provided an electronic device including: an output interface; a communication interface; and a processor configured to: identify an occurrence of event for pairing with a second external device through the communication interface, while the electronic device is paired with a first external device, control the communication interface to release pairing with the first external device and pair with the second external device, set up the electronic device as a primary device for pairing with the first external device, control the communication interface to transmit, to the first external device, information about the electronic device set up as the primary device to perform the pairing with the first external device, and control the output to, based on content data received from the first external device, output content and control the communication interface to transmit the content data to the second external device.

The processor may be further configured to, based on a Media Access Control (MAC) address of the electronic device being identified to be higher than an MAC address of the second external device, set up the electronic device as the primary device.

The processor may be further configured to: based on a Media Access Control (MAC) address of the electronic device being identified to be lower than an MAC address of the second external device, set up the electronic device as a secondary device, and control the communication interface to transmit information for setting up the second external device as the primary device to the second external device.

The processor may be further configured to set up the electronic device as the primary device based on a first input from a user designating the electronic device as the primary device.

The processor may be further configured to, based on a pairing standby signal of the first external device being received by the communication interface, control the communication interface to transmit the information about the primary device to the first external device.

The processor may be further configured to: based on the pairing standby signal of the first external device, control the communication interface to transmit a pairing request signal to the first external device, receive a pairing acceptance signal corresponding to the pairing request signal from the first external device through the communication interface, and based on the transmitted information about the primary device, control the communication interface to perform the pairing with the first external device.

The content data may include a plurality of content data provided according to a plurality of channels, and the processor may be further configured to: control the output interface to output a sound based on a first content data corresponding to a first channel among the plurality of channels, and control the interface to transmit, to the second external device, second content data corresponding to a second channel that is different from the first channel.

The processor may be further configured to identify a second input from user selecting a stereo mode as the occurrence of event.

According to an aspect of the disclosure, there is provided an electronic device including: a communication interface; a processor configured to: control the communication interface to provide content data to a first external device to output content, while the electronic device is paired with the first external device, based on a pairing with the first external device being released by a pairing event of the first external device and a second external device, control the communication interface to broadcast a pairing standby signal for performing the pairing with the first external device or the second external device, receive primary device-setting information from the first external device or the second external device through the communication interface, control the communication interface to, based on the received primary device-setting information, pair with an external device set as a primary device among the first external device and the second external device, and control the communication interface to transmit the content data to the paired external device.

According to an aspect of the disclosure, there is provided a control method of an electronic device, the control method including: identifying an occurrence of event for pairing with a second external device, while the electronic device is paired with a first external device; releasing pairing with the first external device and pairing with the second external device; setting up the electronic device as a primary device for pairing with the first external device; transmitting information about the electronic device set up as the primary device to the first external device to perform the pairing with the first external device and receiving content data from the first external device; and outputting content based on the content data received from the first external device and transmitting the content data to the second external device.

The setting up may include, based on a Media Access Control (MAC) address of the electronic device being identified to be higher than an MAC address of the second external device, setting up the electronic device as the primary device.

The setting up may include: based on a Media Access Control (MAC) address of the electronic device being identified to be lower than an MAC address of the second external device, setting up the electronic device as a secondary device; and transmitting information for setting up the second external device as the primary device to the second external device.

The setting up may include setting up the electronic device as the primary device based on a first input from a user designating the electronic device as the primary device.

The performing the pairing with the first external device may include, based on a pairing standby signal of the first external device, transmitting the information about the primary device to the first external device.

According to an aspect of the disclosure, there is provided a control method of an electronic device including: providing content data to a first external device to output content while the electronic device is paired with the first external device; based on a pairing with the first external device being released by a pairing event of the first external device and a second external device, broadcasting a pairing standby signal for performing the pairing with the first external device or the second external device; receiving primary device-setting information from the first external device or the second external device; based on the received primary device-setting information, performing a pairing with an external device set as a primary device among the first external device and the second external device; and transmitting the content data to the paired external device.

Advantageous Effects

As described above, according to one or more aspects of the present disclosure, the electronic device and the control method thereof may minimize the user's intervention or user input during the multi-point pairing, thereby improving the user's convenience for the multi-point pairing.

MODE FOR DISCLOSURE

Figure 1:
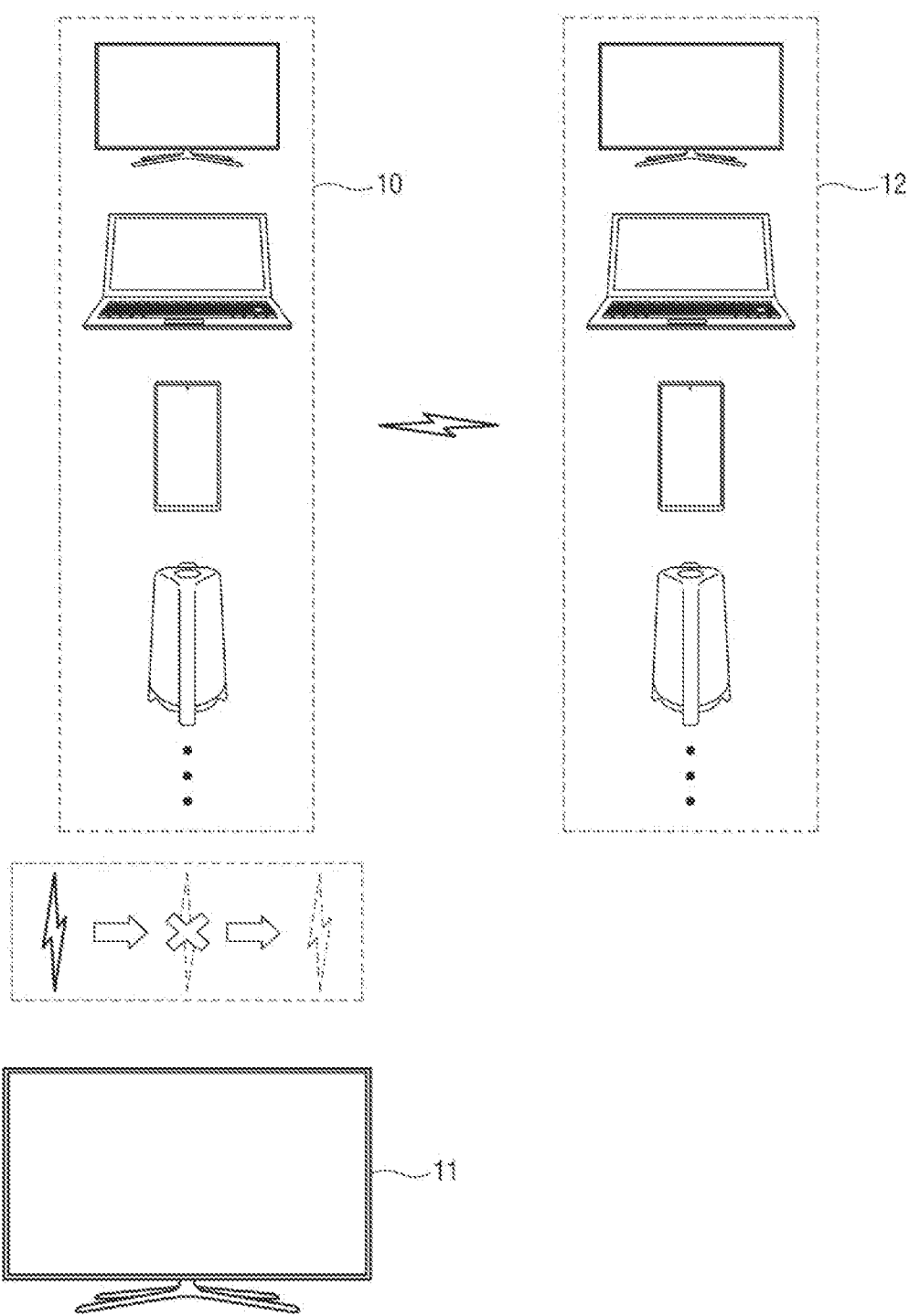
FIG. 1 shows an electronic device with a pairing capability according to an embodiment of the present disclosure.

Hereinafter, embodiments of the present disclosure will be described in detail with reference to the accompanying drawings. In describing the embodiments of the present disclosure below, matters shown in the accompanying drawings are referred to and in the drawings, the same reference numbers or signs refer to components that perform substantially the same function. In the embodiments of the present disclosure, at least one of a plurality of elements refers to not only all of the plurality of elements, but also each one or all combinations thereof excluding the rest of the plurality of elements.

FIG. 1 shows an electronic device with a pairing capability according to an embodiment of the present disclosure.

As shown in FIG. 1, the electronic device 10 may be implemented as an image display device, such as, for example, a television (TV), a smart phone, a notebook computer, a tablet personal computer, a portable media player, a wearable device, a video wall, or an electronic picture frame. However, the disclosure is not limited thereto, and as such, the electronic device 10 may also include a wide variety of devices, which include an image processing device, such as, for example, a set-top box not including a display; a household appliance, such as, for example, a refrigerator or a washing machine; and an information processing device, such as, for example, a main computer. The electronic device 10 may be also implemented as an audio output device. The audio output device may include a wide variety of audio equipment, such as, for example, a unit speaker, a speaker tower having speakers and so on. The speaker may be implemented as an artificial intelligence (AI) speaker, an AI robot and so on.

The electronic device 10 may be paired with at least one of a first external device 11 or a second external device 12. The first external device 11 may include an image display device, such as, for example, a TV, a smart phone, a notebook computer, a tablet personal computer, a portable media player, a wearable device, a video wall, or an electronic picture frame. However, the first external device 11 is not limited thereto, and may be implemented as a wide variety of devices, such as, for example, an image processing device, an information processing device, an information storing device and so on if they are capable of transmitting content data to the electronic device 10 or the second external device 12. The second external device 12 may be implemented as an image display device, an image processing device, an information processing device or an audio output device. The second external device 12 may be provided as a device of the same kind as that of the electronic device 10. For example, if the electronic device 10 is provided as an audio output device, such as a speaker or the like, the second external device 12 may be also provided as the audio output device, such as the speaker or the like.

The electronic device 10 may be paired with the first external device 11 to receive content data from the first external device 11, and output content based on the received content data. The content data may include at least one of video data or audio data, and the content may include at least one of video content or audio content. For example, if the electronic device 10 is implemented as an image display device, an image processing device, an information processing device or the like, it may output at least one of video content or audio content. However, different from the image display device, the image processing device, the information processing device or the like may transmit processed image signal or audio signal to an image display device connected thereto. If the electronic device 10 is implemented as an audio output device, it may output audio content.

The electronic device 10 may implement a single point pairing with the first external device 11 or multi-point pairing with the first external device 11 and the second external device 12. The single point pairing is a case where the electronic device 10 is paired to the first external device 11 to solely output content thereto, as described above. The multi-point pairing is a case where the second external device 12 is added to the single point pairing, i.e., the electronic device 10 is paired to the first external device 11 and the second external device 12, respectively, to transmit content data received from the first external device 11 to the second external device 12, thereby outputting content together with the second external device 12.

In a relation between the electronic device 10 and the second external device 12, if the electronic device 10 is set as a primary (master) device, the electronic device 10 may be paired to the first external device 11 and the second external device 12, respectively, whereas if the second external device 12 is set as the primary device, the second external device 12 may be paired to the first external device 11 and the electronic device 10, respectively. Moreover, if the second external device 12 is composed of a plurality of second external devices, the multi-point pairing where the plurality of second external devices is added to the single point pairing is possible. However, for convenience, the explanation below assumes that the electronic device 10 is set as the primary device and the second external device 12 is composed of a single device.

To be specific with respect to the single point pairing and the multi-point pairing, for example, in case that the electronic device 10 and the second external device 12 are Bluetooth® speakers, the single point pairing may mean that the electronic device 10 is paired with the first external device 11 via Bluetooth® to receive audio data therefrom and solely output audio based on the received audio data. The multi-point pairing means that the second external device 12 is added to the single point pairing, so that the second external device 12 is paired to the electronic device 10 via Bluetooth®. In this case, the electronic device 10 may not only output audio based on audio data received from the first external device 11, but also transmit the audio data to the second external device 12 paired via Bluetooth®, so that the second external device 12 outputs the audio. The multi-point pairing using the Bluetooth® speakers may be called a stereo group setting or a stereo mode.

According to an embodiment, if the electronic device 10 performs the multi-point pairing, which adds the second external device 12, in a single point pairing state with the first external device 11, the electronic device 10 releases the pairing with the first external device 11. In this case, the electronic device 10 releases the pairing with the first external device 11 in the multi-point pairing because any one of the electronic device 10 or the second external device 12 set up as a primary device may perform the pairing with the first external device 11. For example, the second external device 12 as well as the electronic device 10 may set up as the primary device in the multi-point pairing. As such, the electronic device 10 is first to release the pairing with the first external device 11. Accordingly, if the electronic device 10 is set up as the primary device, the electronic device 10 first performs the pairing with the second external device 12, and then performs the pairing with the first external device 11 again. To the contrary, if the second external device 12 is set up as the primary device, the second external device 12 may try the pairing with the first external device 11. The multi-point pairing when the second external device 12 is set up as the primary device will be described in more detail with reference to FIGS. 5 and 6. Hereinafter, for convenience, the explanation below assumes that the electronic device 10 is set up as the primary device to first release the pairing with the first external device 11.

As described above, during the multi-point pairing attempt, the electronic device 10 first releases the pairing with the first external device 11, but as the primary device, the electronic device 10 automatically performs the pairing with the first external device 11 again after performing the pairing with the second external device 12. Therefore, the multi-point pairing according to an embodiment of the disclosure does not require a user to search for the electronic device 10 or the second external device 12 through the first external device 11 or identify any one set up as the primary device among the searched electronic device 10 or second external device 12 to select for the pairing. Accordingly, user's intervention during the multi-point pairing may be minimized, thereby improving user's convenience for the multi-point pairing.

Figure 2:
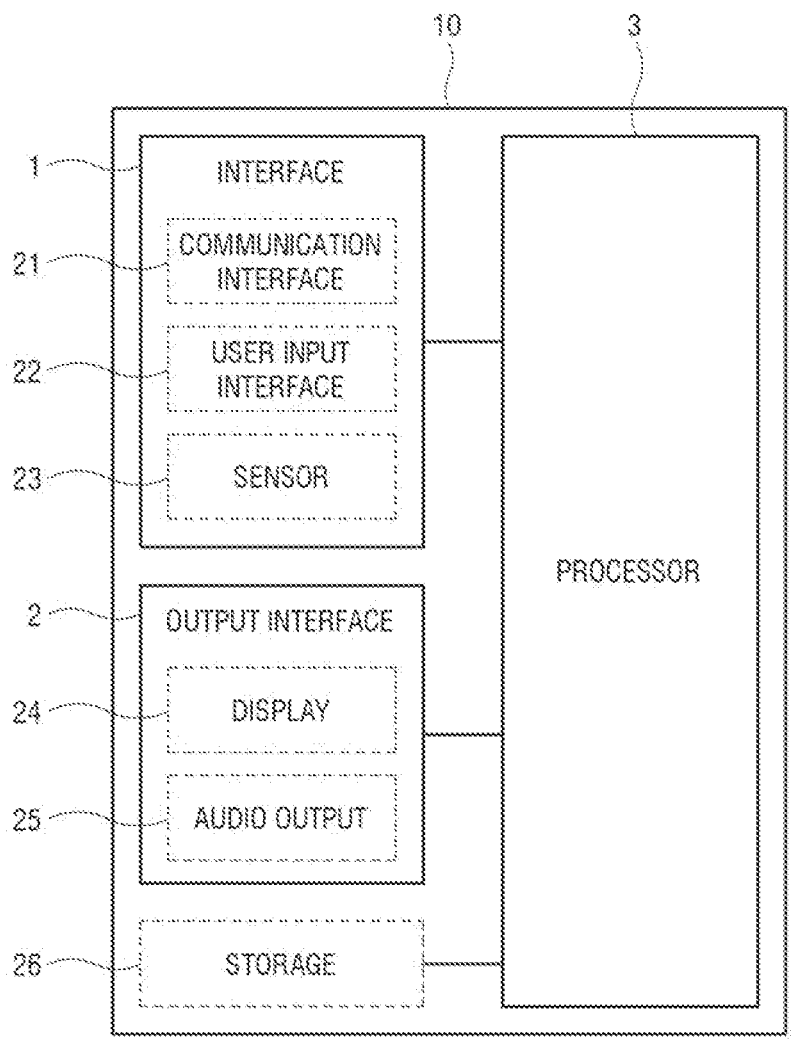
FIG. 2 shows an example of a structure of the electronic device of FIG. 1.

FIG. 2 shows an example of a structure of the electronic device of FIG. 1.

Hereinafter, the structure of the electronic device 10 illustrates an implementation of the electronic device 10 as an audio output device such as a speaker or the like. However, as described above, since the electronic device 10 may be implemented as a wide variety devices, the disclosure is not limited to an audio output device. That is, the electronic device 10 may be implemented as an image display device, an image processing device, an information processing device and so on.

The electronic device 10 include an interface 1. The interface 1 may include a wired interface. The wired interface may include a connector or port to which a cable capable of receiving signals may be connected. As another example, the electronic device 10 may have an antenna capable of receiving signals. The wired interface may include a connector or port according to transmission standard of at least one among video or audio, such as an HDMI port, a display port (DP), a DVI port, thunderbolt, composite video, component video, super video, SCART or the like. The wired interface may include a connector or port according to universal data transmission standard, such as a USB port or the like. The wired interface may include a connector or port to which an optical cable may be connected according to optical transmission standard. The wired interface may include a connector or port according to network transmission standard, such as Ethernet or the like. For example, the wired interface may be implemented as LAN card or the like, which is wired to a router or a gateway.

The wired interface may be wired in a 1:1 or 1:N (here, N is a natural number) manner with the first external device 11, the second external device 12, a server and the like via the connector or port, thereby transmitting and receiving content data thereto and therefrom. The wired interface may include connectors or ports, which separately transmit the content data. The wired interface is embedded in the electronic device 10, but may be also implemented in the form of a dongle or module to be attached to or detached from the connector of the electronic device 10.

The interface 1 may include a wireless interface. The wireless interface may be implemented in a variety of ways to correspond to implementation forms of the electronic device 10. For example, the wireless interface may use wireless communication in communication ways, such as radio frequency (RF), zigbee, Bluetooth®, Wi-Fi, ultra-wideband (UWB), near field communication (NFC) and so on. The wireless interface may be implemented as a wireless communication module performing wireless communication with an access point (AP), a wireless communication module performing 1:1 direct wireless communication, such as Bluetooth® or the like, and so on, according to Wi-Fi methods. The wireless interface may support the single point pairing and the multi-point pairing. The wireless interface may perform the multi-point pairing with devices, which use different profiles. Here, the profiles may include hands free profile (HFP), advanced audio distribution profile (A2DP), headset profile (HSP), human interface profile (HID) and so on, but are not limited thereto.

The wireless interface may communicate by wireless with at least one server on the network, thereby transmitting and receiving data packets between with the at least one server. The wireless interface may include an infrared (IR) transmitter and/or an IR receiver, which can transmit and/or receive IR signals according to IR communication standard. The wireless interface may receive or input a remote control signal from a remote controller or other external devices, or transmit or output to the remote controller or the other external devices via the IR transmitter and/or the IR receiver. The remote controller may include a smart phone and the like on which a remote controller application is installed. As another example, the electronic device 10 may transmit and receive the remote control signal with the remote controller or the other external devices via wireless interfaces of different ways, such as Wi-Fi, Bluetooth® and so on.

The electronic device 10 may include a communication interface 21. According to an embodiment, the communication interface 21 may include at least one configuration of a wired interface or a wireless interface and perform at least one function of the wired interface or the wireless interface. As an example, the communication interface 21 may form the single point pairing by pairing with the first external device 11. The communication interface 21 may form the multi-point pairing by adding the second external device 12 in a single point pairing state. The communication interface 21 may include a first communication interface and a second communication interface, which are paired with the first external device 11 and the second external device 12, respectively. The first communication interface and the second communication interface may be provided to be able to perform the multi-point pairing with the first external device 11 and the second external device 12 according to the profiles as described above.

The electronic device 10 includes a user input interface 22. The user input interface 22 includes a circuit related to various types of input interfaces, which are provided to manipulate by the user to perform user's input. The user input interface 22 may be configured in many different forms according to kinds of the electronic device 10. As an example, there are a mechanical or electronic button of the electronic device 10, a touch pad of the electronic device 10, a touch screen installed on a display 24 of the electronic device 10 and so on.

The electronic device 10 includes a sensor 23. The sensor 23 senses a front of the electronic device 10 to detect, for example, existence and nonexistence, movement and the like of the user or other devices. As an example, the sensor 23 may be implemented as an image sensor, and may capture the front of the electronic device 10 to obtain information about the existence and nonexistence, the movement and the like of the user or other devices from the captured image. The image sensor may be implemented as a complementary metal oxide semiconductor (CMOS) or a charge coupled device (CCD) camera. Or, the sensor 23 may be implemented as an infrared sensor and may measure a time in which an infrared signal output toward the front is reflected back to obtain the information about the existence and nonexistence, the movement and the like of the user or other devices.

The electronic device 10 includes an output interface 2. The output interface 2 may output content based on content data. The output interface 2 may output at least one of video content or audio content according to kinds of the content data. However, kinds of the contents are not limited, so the output interface 2 may output many different kinds of contents. The output interface 2 may include at least one of a display 24 or an audio output 25, which is described below, to correspond to the output content forms.

According to an embodiment, output interface 2 may include a display 24. The display 24 includes a display panel, which can display an image on a screen. The display panel is provided with a light receiving structure, such as a liquid crystal display panel, or a spontaneous emission structure, such as an organic light emitting diode (OLED) panel. The display 24 may include an additional structure according to a structure of the display panel. For example, if the display panel is a liquid crystal type, the display 24 includes a liquid crystal display panel, a backlight unit configured to supply light, and a panel driving substrate configured to drive a liquid crystal of the display panel. However, if the electronic device 10 is implemented as a set-top box, a speaker and the like, the display 24 may be omitted. According to an embodiment, display 24 may further include components or circuitry configured to display content.

According to an embodiment, output interface 2 may include an audio output 25. The audio output 25 may be referred to as a sound output, and may output many different audios based audio data. The audio output 25 may be implemented as at least more than one speaker. The audio output 25 may be implemented as an inner speaker or an outer speaker provided in the inside or the outside of the electronic device 25, respectively. If the audio output 25 is implemented as the outer speaker, the electronic device 10 may transmit the audio data by wire or wireless to the outer speaker via the interface 1. According to an embodiment, audio output 25 may further include audio components or circuitry configured to output audio data.

Respective components of the output interface 2 as described above are explained in separate configurations from the interface 1, but according to an embodiment, may be provided to be included in the interface 1. Also, if the content data received via the interface 1 is a broadcast signal, the electronic device 10 may further include a tuner, which tunes the received broadcast signal according to channels.

The electronic device 10 includes a storage 26. The storage 26 includes non-volatile storages in which data can be stored regardless of whether or not power is provided, and volatile memories, which load data to be processed by a processor 3 and in which data cannot be stored if power is not provided. In the non-volatile storages are flash-memory, hard-disc drive (HDD), solid-state drive (SSD), read only memory (ROM) and so on and in volatile memories are buffer, random access memory (RAM) and so on.

The electronic device 10 includes a processor 3. The processor 3 includes at least one hardware processor, which is implemented as a CPU, a chipset, a buffer, a circuit and/or so on. The processor 3 may be implemented as a system on chip (SOC) according to design methods. The processor 3 includes at least one from among modules corresponding to various processes, such as a demultiplexer, a decoder, a scaler, an audio digital signal processor (DSP), an amplifier and so on. Some or all of these modules may be implemented as the SOC. For example, it is possible to implement the modules related to image processing, such as the demultiplexer, the decoder, the scaler and the like, as an image processing SOC, and to implement the audio DSP as a separate chipset from the image processing SOC.

According to an embodiment, the processor 3 may identify an occurrence of event for pairing with the second external device 12 while being paired with the first external device 11 providing the content data via the interface 1. For example, the processor 3 may identify the multi-point pairing of adding the second external device 12 while being in a single point pairing state with the first external device 11. The processor 3 may control the interface 1 to release the pairing with the first external device 11 and to perform the pairing with the second external device 12. The processor 3 may set up the electronic device 10 as a primary device for pairing with the first external device 11, and control the interface 1 to transmit information about the primary device set up to the first external device 11 thus to perform the pairing with the first external device 11. The processor 3 may control the output interface 2 to output content based on content data received from the first external device 11, and control the interface 1 to transmit the content data to the second external device 12.

As another example, the processor 3 may perform at least one from among operations as described above while communicating with the server via the interface 1. The processor 3 may perform at least one of the operations including the identification of the event occurrence, the pairing release with the first external device 11 and the pairing with the second external device 12, the pairing again with the first external device 11, and the output of the content and the content data transmission of the content data to the second external device 12, and the server may perform the remaining operations.

However, structure of the electronic device 10 are not limited to those shown in FIG. 2, and according to another embodiment, some of the components as described above may be excluded from the structure of the electronic device 10 or components other than those above may be further included in the electronic device 10. For example, the electronic device 10 includes an audio receiver. The audio receiver may receive a voice signal for user's voice uttered from the user. In this case, the processor 3 may perform voice recognition function according to user's utterance voice received via the audio receiver. If receiving utterance voice from the user, the processor 3 may obtain a voice signal for the utterance voice, perform a voice recognition processing for the obtained voice signal, and perform an operation corresponding to recognition results by the voice recognition processing. The voice recognition processing includes a speech-to-text (STT) processing process, which converts the voice signal into text data, and a command identification and performing process, which identifies a command represented by the text data and performs an operation indicated by the identified command.

According to an embodiment, both the STT processing process and the command identification and performing process in the voice recognition processing may be carried out in the electronic device 10. However, since there is a concern that system load and storage capacity required in the electronic device 10 will be relatively large, at least some of the processes may be performed by at least one server, which is connected to communicate with the electronic device 10 via the network. As an example, the at least one server may perform the STT processing process and the electronic device 10 may perform the command identification and performing process. According to another embodiment, the at least one server may perform both the STT processing process and the command identification and performing process, and the electronic device 10 may only receive results from the at least one server.

According to another embodiment, by using at least one of machine learning, neural network, or deep learning algorithm as rule base or artificial intelligence (AI) algorithm, the processor 3 may perform at least some of data analysis, processing and result information generation for performing the at least one of the operations including the identification of the event occurrence, the pairing release with the first external device 11 and the pairing with the second external device 12, the pairing again with the first external device 11, the output of the content and the content data transmission of the content data to the second external device 12.

As an example, the processor 3 may perform a function of a learning block and a function of a recognition block together. The learning block may perform a function of generating learned neural network and the recognition block may perform a function of recognizing (or, deducing, predicting, estimating and determining) data using the learned neural network. The learning block may generate or update the neural network. To generate or update the neural network, the learning block may obtain learning data. As an example, the learning block may obtain the learning data from the storage 26 or a server storage or from the outside. The learning data may be data using for learning the neural network, and teach the neural network by using data that performed the operations described above as the learning data.

Prior to training the neural network by using the learning data, the learning block may perform a preprocessing operation with respect to the obtained learning data, or select data to be used in learning among a plurality of learning data. As an example, to process in a form of data adapted to learning, the learning block may process the learning data in a predetermined format, filter the learning data, add noise into the learning data or remove noise from the learning data. The learning block may generate neural network set up to perform the operations described above using the preprocessed learning data.

The learned neural network may be configured as a plurality of neural networks (or layers). Nodes of the plurality of neural networks have weight values, and the plurality of the plurality of neural network may be connected each other, so that an output value of one neural network is used as an input value of the other neural network. The neural networks may include models, such as, for example, convolutional neural network (CNN), deep neural network (DNN), recurrent neural network (RNN), restricted Boltzmann machine (RBM), deep belief network (DBN), bidirectional recurrent deep neural network (BRDNN) and deep Q-network.

According to an embodiment, to perform the operations described above, the recognition block may obtain target data. The target data may be obtained from the storage 26 or the server storage or from the outside. The target data may be data, which becomes a recognition target for the neural network. Prior to apply the target data to the learned neural network, the recognition block may perform a preprocessing operation with respect to the obtained target data, or select data to be used in recognizing among a plurality of target data. As an example, to process in a form of data adapted to recognizing, the recognition block may process the target data in a predetermined format, filter the target data, or add noise into the target data or remove noise from the target data. The recognition block may apply the preprocessed target data to the neural network, thereby obtaining an output value outputted from the neural network. The recognition block may obtain a probability value or a reliability value along with the output value.

Also, the first external device 11 and the second external device 12 may be provided to include at least one of the components of the electronic device 10 as described above. For example, the first external device 11 and the second external device 12 may include an interface, an output, a storage, and a processor, respectively. The interface of the first external device 11 and the second external device 12 may include a communication interface, a user input circuit, and a sensor, and the output interface may include a display and an audio output. Since respective components of the first external device 11 and the second external device 12 are the same as those of the electronic device 10, explanations thereon will be omitted.

Figure 3:
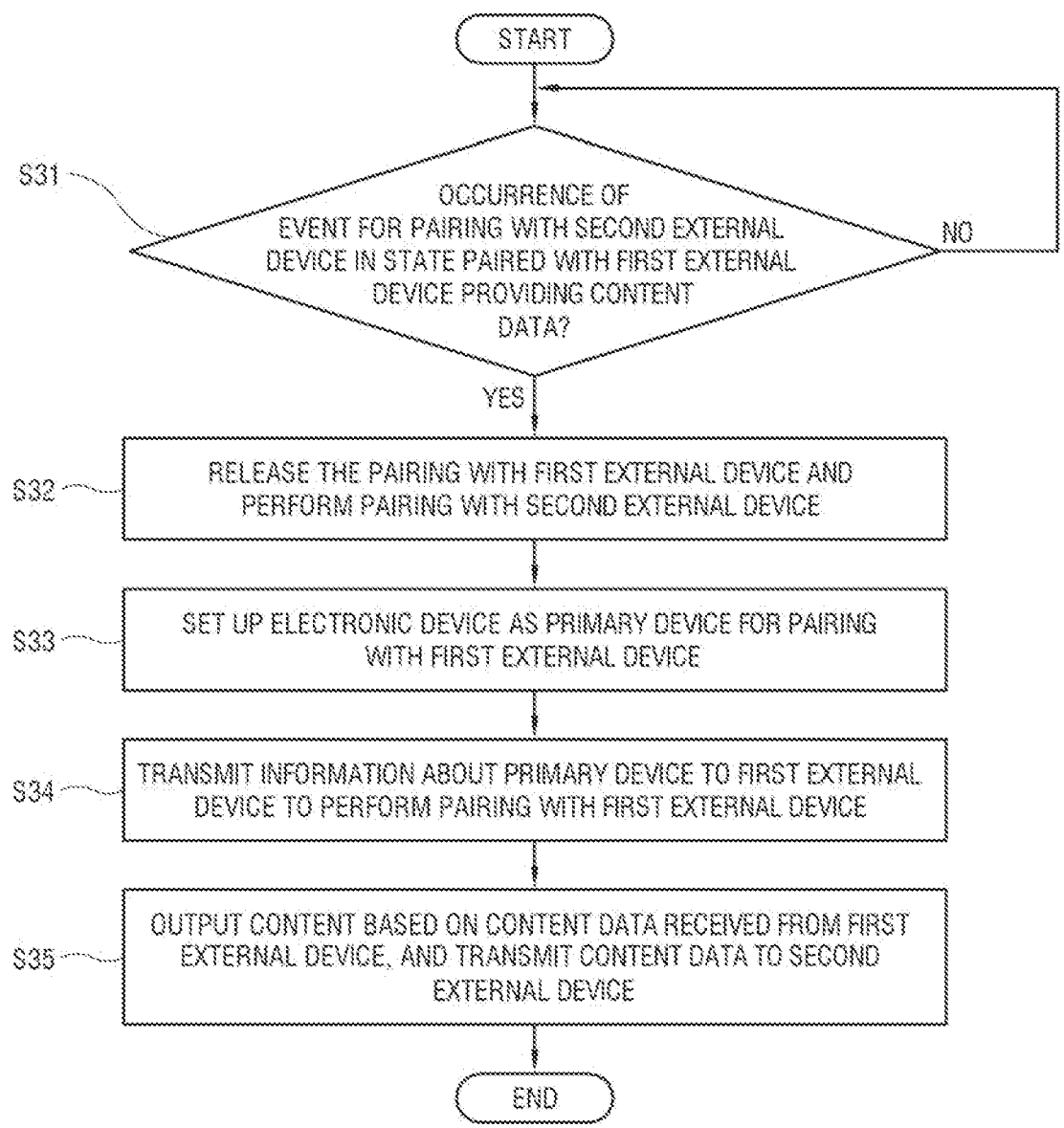
FIG. 3 shows an example of a control method of the electronic device of FIG. 1.

FIG. 3 shows an example of a control method of the electronic device shown in FIG. 1 according to an embodiment.

According to an embodiment, operations of FIG. 3 may be executed by the processor 3 of the electronic device 10. As shown in FIG. 3, the processor 3 may identify an occurrence of event for pairing with the second external device 12 through the interface 1 in a state paired with the first external device 11 providing content data (S31).

The processor 3 may release the pairing with the first external device 11 and perform the pairing with the second external device 12 (S32).

The processor 3 may set up the electronic device 10 as a primary device for pairing with the first external device 11 (S33).

The processor 3 may transmit information about the primary device to the first external device 11 to perform the pairing with the first external device 11 (S34).

The processor 3 may output content based on content data received from the first external device 11, and transmit the content data to the second external device 12 (S35).

As discussed above, when implementing the multi-point pairing of adding the second external device 12 while being in the single point pairing state with the first external device 11, the processor 3 may release the established pairing with the first external device 11, but automatically perform the pairing with the first external device 11 again after pairing with the second external device 12. Accordingly, the electronic device may minimize user's intervention during the multi-point pairing, thereby improving user's convenience for the multi-point pairing.

Figure 4:
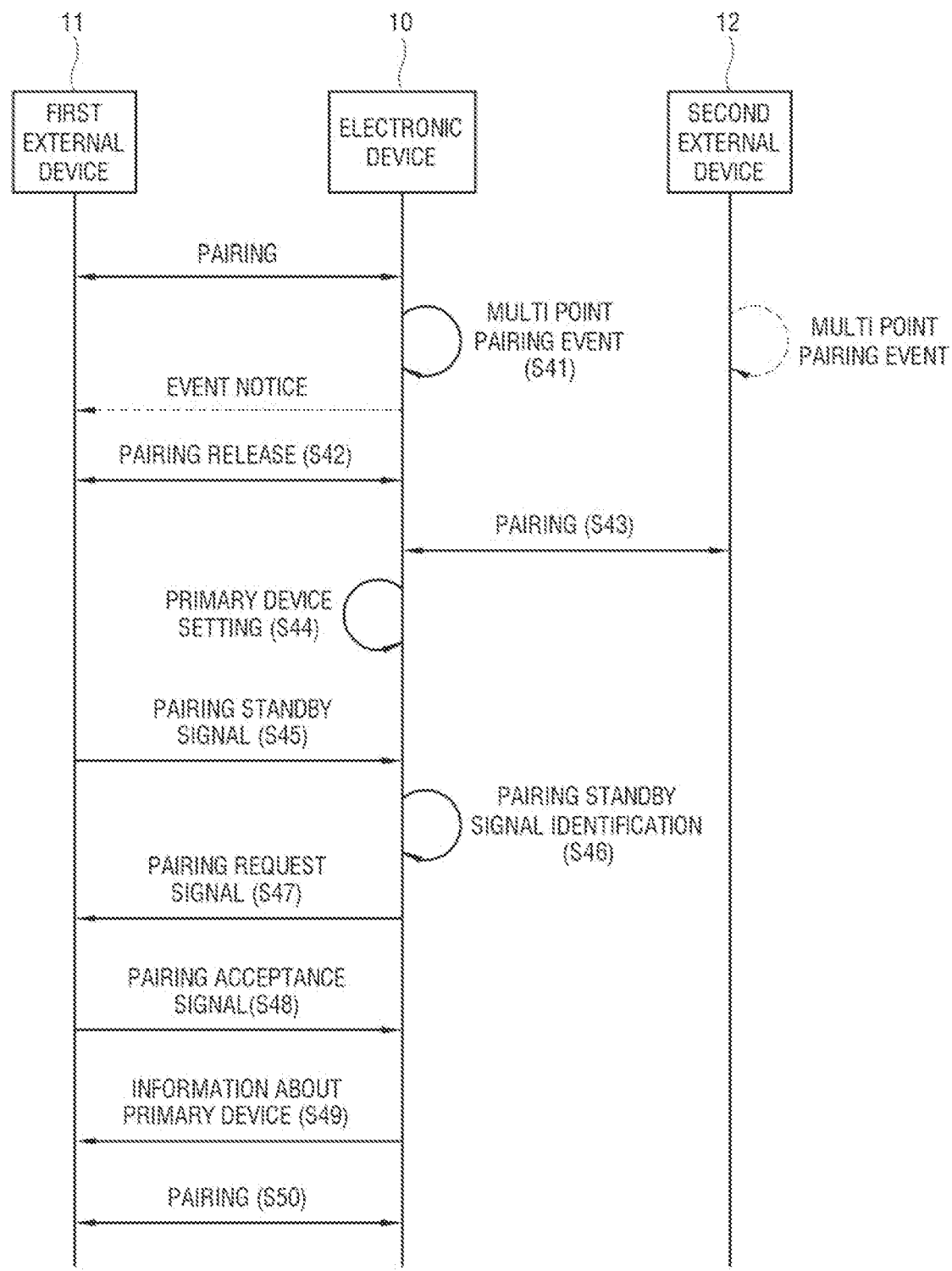
FIG. 4 shows an example of a multi-point pairing process if the electronic device is a primary device, in relation to an operation S33 of FIG. 3.

FIG. 4 illustrates an embodiment of a multi-point pairing process in which the electronic device is the primary device, in relation to the operation S33 of FIG. 3.

Hereinafter, the multi-point pairing process previously explained with reference to FIG. 1 will be explained in more detail with reference to FIG. 4. In the following explanations, the multi-point pairing process are based on Bluetooth® pairing, but this is for convenience of explanation and may be also equally applied in multi-pointing pairings based on various communication protocols other than the Bluetooth® pairing.

As shown in FIG. 4, the electronic device 10 may receive a multi-point pairing event in a paired state in which the electronic device 10 is paired with the first external device 11 (S41). The paired state with the first external device 11 may be a state according to a normal Bluetooth® pairing process. For example, the first external device 11 may search for Bluetooth® devices, which are within a range capable of pairing therewith, and perform a pairing with the electronic device 10 among the Bluetooth® devices discovered by the search. The search and the like as described above may be also done through the electronic device 10.

The multi-point pairing event may include an input from a user for adding the second external device 12 through the Bluetooth® pairing, an input from the user for transmitting content data received from the first external device 11, to the second external device 12 through the Bluetooth® pairing. The multi-point pairing event may be received from at least one of the electronic device 10 or the second external device 12. The multi-point pairing event will be described in detail with reference to FIG. 8.

The electronic device 10 may release the pairing with the first external device 11 in response to the multi-point pairing event (S42), and perform a pairing with the second external device 12 (S43). The pairing with the second external device 12 may be performed according to the normal Bluetooth® pairing process. As an example, the electronic device 10 may search for the second external device 12, and perform the pairing with the searched second external device 12.

The electronic device 10 may set up the electronic device 10 as a primary device (S44). The primary device plays a role, which performs the pairing with the first external device 11 to output content based on content data received from the first external device 11 and meanwhile to transmit the content data received from the first external device 11 to a secondary (slave) device. If the electronic device 10 is set up as the primary device, the second external device 12 may be set up as the secondary device. On the contrary, if the electronic device 10 is set as the secondary device, the second external device 12 may be set as the primary device. These device role settings will be described in detail with reference to FIG. 7. However, in FIG. 4, for convenience of explanation, it is assumed that the electronic device 10 is set as the primary device and the second external device 12 is set as the secondary device.

To perform the pairing with the first external device 11, the electronic device 10, which is set up as the primary device, may identify whether or not a pairing standby signal is received from the first external device 11 (S46). According to an embodiment, the first external device 11 may transmit a pairing standby signal (S45), and the pairing standby signal may include a signal informing that the first external device 11 is in a state capable of pairing. The pairing standby signal may be output in a broadcasting method from the first external device 11. The first external device 11 may output the pairing standby signal from a time of releasing the pairing with the electronic device 10 or a power-on time. However, the disclosure is not limited thereto, and if receiving a notice about the multi-point pairing event from the electronic device 10, the first external device 11 may also output the pairing standby signal. The pairing standby signal may be output periodically or aperiodically.

If the pairing standby signal is received and identified, the electronic device 10 may transmit a pairing request signal to the first external device 11 from which the received pairing standby signal is output (S47), and receive a pairing acceptance signal corresponding to the pairing request signal from the first external device 11 (S48).

The electronic device 10 may transmit information about the primary device to the first external device 11 (S49). The information about the primary device as an identification information indicating that the electronic device 10 is the primary device may include, for example, at least one of device number, Internet Protocol (IP) address, or (Media Access Control) MAC address of the electronic device 10. However, the disclosure is not limited thereto, and the information about the primary device may include many different information about the electronic device 10. The first external device 11 may receive the information about the primary device, and identify that the electronic device 10 is the primary device, based on the received information about the primary device.

According to an embodiment, the electronic device 10 may perform a pairing with the first external device 11 (S50). The electronic device 10 may omit at least one of the operation S47 or the operation S48. As an example, if there is a history that the electronic device 10 has been previously paired with the first external device 11, the processor 3 may omit at least one of the operation S47 or the operation S48, and perform the pairing immediately after transmitting the information about the primary device to the first external device 11. However, if there is no history that the electronic device 10 has been previously paired with the first external device 11, the processor may perform all the operations for pairing as described above.

According to an embodiment, when the first external device 11 is paired with the electronic device 10, which is the primary device, the first external device 11 may transmit content data to the electronic device 10. The processor 3 of the electronic device 10 plays a role as the primary device. In other words, the processor 3 of electronic device 10 may output content based on the content data received from the first external device 11, and transmit the content data to the second external device 12, which is the secondary device.

Moreover, according to an embodiment, when the first external device 11 is in a paired state with the electronic device 10, a processor of the first external device 11 may control an interface of the first external device 11 to provide the content data to the electronic device 10, so that the electronic device 10 outputs the content.

If the pairing with the electronic device 10 is released due to the multi-point pairing event between the electronic device 10 and the second external device 12 (S42), the processor of the first external device 11 may control the interface to broadcast the pairing standby signal for performing the pairing with the electronic device 10 or the second external device 12 (S45). As another example, the processor of the first external device 11 may receive notice information about occurrence of the multi-point pairing event from the electronic device 10 or the second external device 12, and based on the notice information, the processor of the first external device 11 may control the interface to release the pairing with the electronic device 10 (S42) or broadcast the pairing standby signal (S45).

Furthermore, when receiving the pairing request signal corresponding to the pairing standby signal through the interface (S47), the processor of the first external device 11 may output the pairing acceptance signal corresponding to the pairing request signal (S48).

The processor of the first external device 11 may receive, for example, primary device-setting information from the electronic device 10 set as the primary device through the interface (S49), and may control the interface to perform the pairing with the electronic device 10, which is the primary device, based on the primary device-setting information (S50). The processor of the first external device 11 may control the interface to transmit the content data to the electronic device 10 with which the pairing is performed.

As described above, when the electronic device 10 receives the multi-point pairing event in the state in which it is single point-paired with the first external device 11, the processor 3 of the electronic device 10 releases the established pairing with the first external device 11, but may automatically perform the pairing with the first external device 11 again after the pairing with the second external device 12, thereby minimizing the user's intervention during the multi-point pairing thus to improve the user's convenience for the multi-point pairing.

Figure 5:
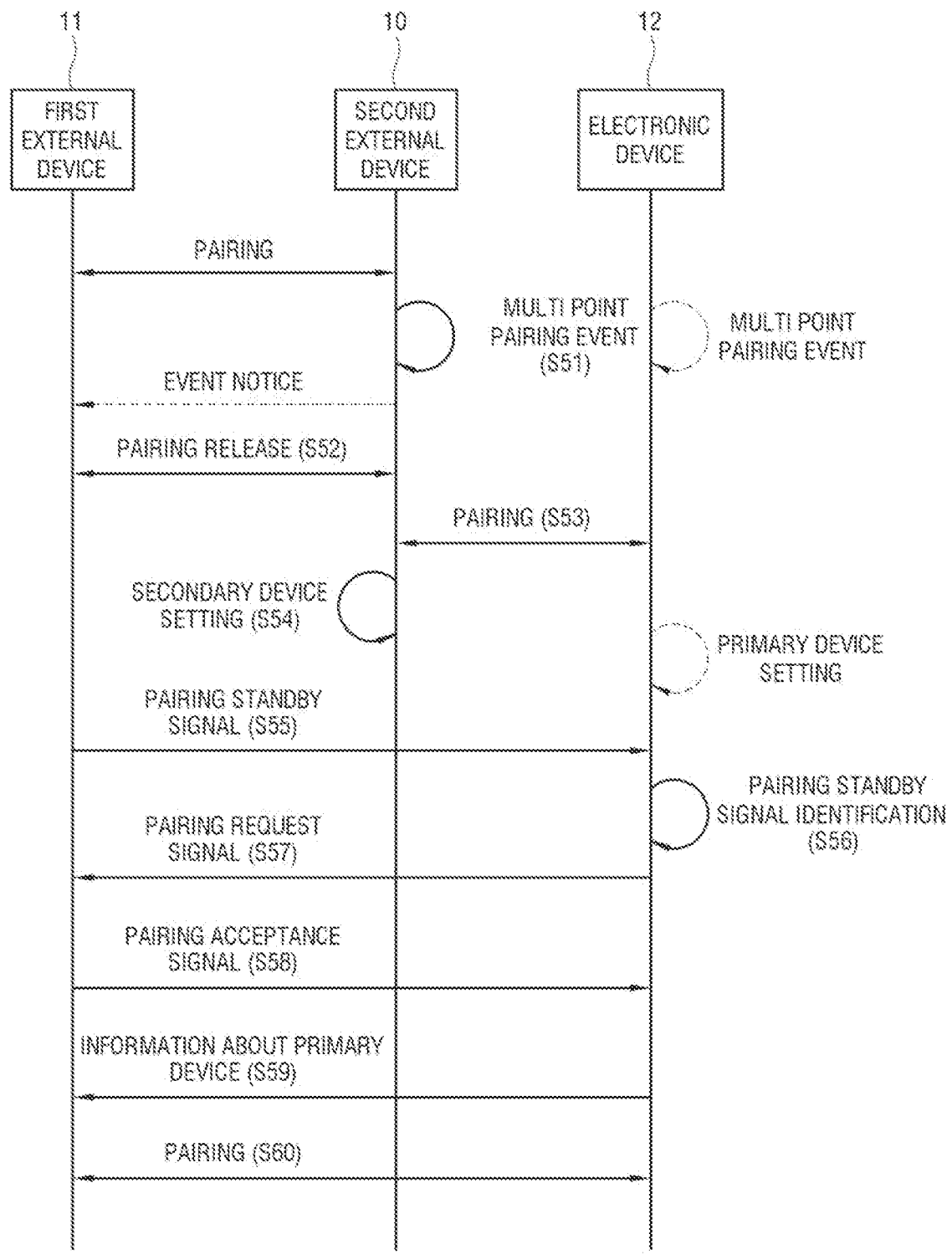
FIG. 5 shows another example of the multi-point pairing process in relation to the operation S33 of FIG. 3.

FIG. 5 the multi-point pairing process according to another embodiment in relation to the operation S33 of FIG. 3.

The multi-point pairing process in which the electronic device 10 is set up as the primary device has been described above with reference to FIG. 4. Hereinafter, a multi-point pairing process in which the second external device 12 of FIG. 4 that is added to the existing single point pairing is set up as the primary device is described in detail with reference to FIG. 5. In the following description, it should be appreciated that terms, such as the electronic device, first external device and second external device, are not fixedly referred to specific devices, and according to occasions, may be referred to various devices and also interchanging with other terms. Accordingly, for convenience of explanation, in the following embodiment of the disclosure, the electronic device 10 and the second external device 12 of the FIG. 4 will be referred to as a second external device 10 and an electronic device 12, respectively. Also, processes duplicate with explanations of FIG. 4 are briefly described and processes different therefrom are described in detail.

As shown in FIG. 5, if a second external device 10 receives a multi-point pairing event (S51) in a state paired with a first external device 11 to form the single point pairing, a processor 3 of the second external device 10 may release the pairing with the first external device 11 (S52), and perform a pairing with an electronic device 12 (S53). Corresponding if an electronic device 12 receives a multi-point pairing event in the state where the second external device 10 is paired with the first external device 11, a processor of the electronic device 12 may perform a pairing with the second external device 10, which has previously released the pairing with the first external device 11 (S53).

If the second external device 10 is set as a secondary device (S54), the processor of the electronic device 12 may set up the electronic device 12 as a primary device. To perform a pairing with the first external device 11 as the primary device, the processor of the electronic device 12 may identify whether or not a pairing standby signal is received from the first external device 11 (S56), when the first external device transmits the pairing standby signal (S55). When the pairing standby signal is received, the processor of the electronic device 12 may transmit a pairing request signal to the first external device 11 from which the pairing standby signal is outputted (S57), and receive a pairing acceptance signal corresponding to the pairing request signal from the first external device 11 (S58).

The processor of the electronic device 12 may transmit information about the primary device to the first external device 11 (S59). The information about the primary device may include identification information indicating that the electronic device 12 is the primary device. The first external device 11 may receive the information about the primary device from the electronic device 12, and identify that the electronic device 12 is the primary device, based on the received information about the primary device.

The processor of the electronic device 12 may perform a pairing with the first external device 11 (S60). If there is a history of with the first external device 11, the processor of the electronic device 12 may omit at least one of the operation S57 or the operation S58.

If being paired with the electronic device 12, which is the primary device, the first external device 11 may transmit content data to the electronic device 12. The processor of the electronic device 12 may output content based on the content data received from the first external device 11, and transmit the content data to the second external device 10, which is the secondary device. A processor of the second external device 10 may output content based on the content data received from the electronic device 12.

As above, if receiving the multi-point pairing event, the processor of the electronic device 12 may not only perform the pairing with the second external device 10 in addition to the existing single point pairing, but also automatically perform the pairing with the first external device 11 as the primary device. Accordingly, the processor of the electronic device 12 may minimize user's intervention during the multi-point pairing, thereby improving user's convenience for the multi-point pairing.

Figure 6:
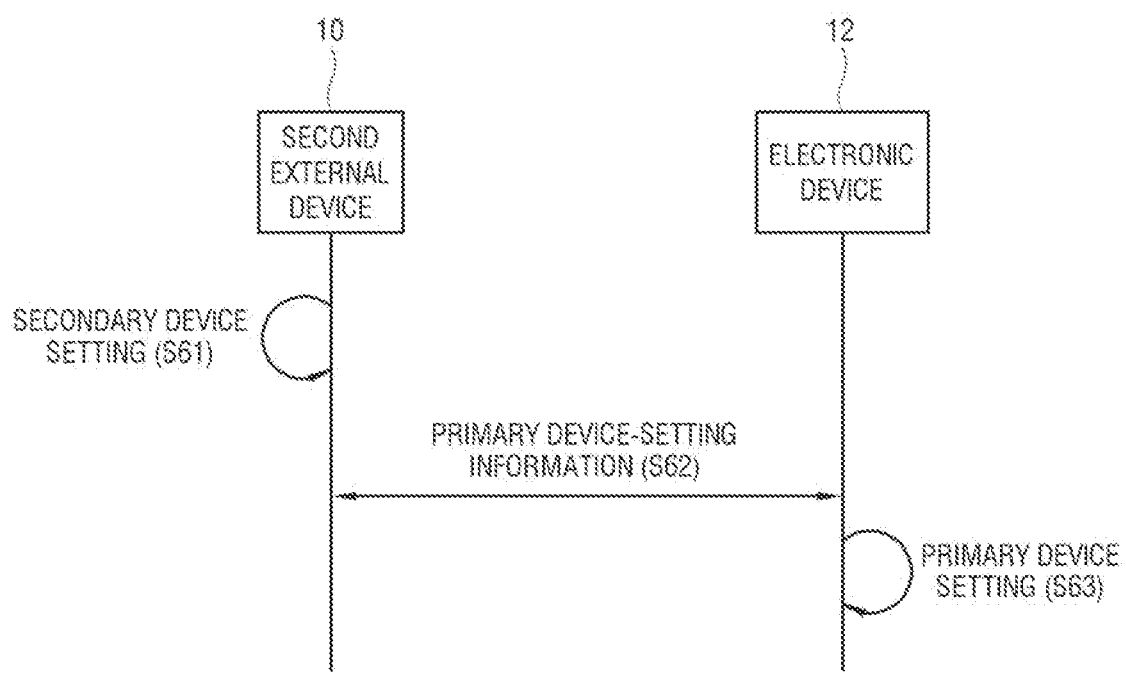
FIG. 6 shows a process of transmitting primary device-setting information in relation to an operation S54 of FIG. 5.

FIG. 6 shows a process of transmitting primary device-setting information in relation to the operation S54 of FIG. 5.

As previously described with reference to FIG. 5, in the embodiment of the disclosure, the arrangement of the electronic device 12 and the second external device 10 of the FIG. 4 will be changed in FIG. 6.

A processor 3 of the second external device 12 may set up the second external device 12 as a secondary device (S61). The processor 3 of the second external device 12 may transmit primary device-setting information for setting up the electronic device 12 as a primary device, to the electronic device 12 (S62). The primary device-setting information may include at least one of information automatically setting up the electronic device 12 as the primary device, information setting up the electronic device 12 as the primary device through an application executed in the electronic device 12, information about user interface for setting up the electronic device 12 as the primary device, or information about content data. However, the disclosure is not limited thereto and the primary device-setting information may include information informing that the second external device 12 is set up as the secondary device.

The processor of the electronic device 12 may set up the electronic device 12 as the primary device based on the primary device-setting information received from the second external device 10.

As above, since the processor of the electronic device 12 may set up the electronic device 12 as the primary device based on the primary device-setting information received from the second external device 10, it may minimize user's intervention during the multi-point pairing, thereby improving user's convenience for the multi-point pairing.

Figure 7:
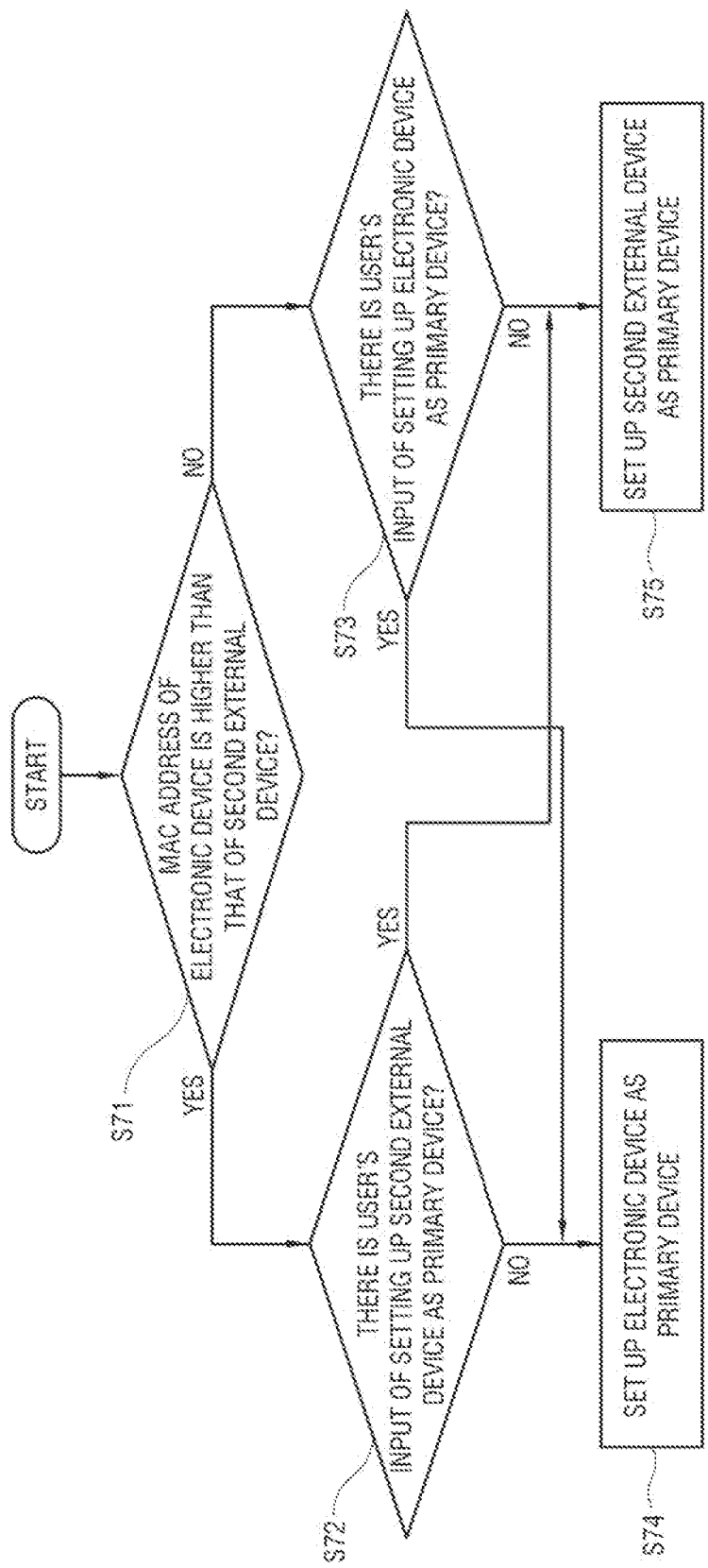
FIG. 7 shows an example of a process by which a device role is set up in relation to the operation S33 of FIG. 3.

FIG. 7 shows an example of a process by which device role is set up according to an embodiment in relation to the operation S33 of FIG. 3.

As shown in FIG. 7, in response to the multi-point pairing event, the processor 3 of the electronic device 10 may identify whether or not an MAC address of the electronic device 10 is higher than an MAC of the second external device 12 (S71). If the MAC address of the electronic device 10 is higher than the MAC address of the second external device 12, the processor 3 may identify whether or not there is an input from the user for setting up the second external device 12 as a primary device (S72). The user's input may be received via the electronic device 10 or the second external device 12. However, the disclosure is not limited thereto, and the user's input may be also inputted via the first external device 11 and the processor 3 may receive information about the user's input from the first external device 11. The setting of device role by the user's input will be described with reference to FIG. 9.

If there is no user's input of setting up the second external device 12 as the primary device, the processor 3 may set up the electronic device 10 as the primary device (S74), but if there is the user's input, may set up the second external device 12 as the primary device (S75). In this case, the processor 3 transmits primary device-setting information to the second external device 12, as described above with reference to FIG. 6.

If the MAC address of the electronic device 10 is lower than the MAC address of the second external device 12 at the operation S71, the processor 3 identifies whether or not there is a user's input of setting up the electronic device 10 as the primary device (S73). If there is the user's input of setting up the electronic device 10 as the primary device, the processor 3 sets up the electronic device 10 as the primary device (S74), but if there is no user's input of setting up the electronic device 10 as the primary device, sets up the second external device 12 as the primary device (S75). In this case, the processor 2 transmits primary device-setting information to the second external device 12, as described above.

In the embodiment discussed above, in order to determine the device role, both the MAC address and the user's input are considered, but the disclosure is not limited thereto and the processor 3 may consider only one of the MAC address or the user's input. For example, the processor 3 may determine the device role by considering only the MAC address or only the user's input.

On the other hand, the first external device 11 performs a pairing with a device set up as the primary device to transmit content data to the device set up as the primary device. At this time, as described with reference to FIG. 7, in the multi-point pairing, the electronic device 10 may be set up as the primary device, or the second external device 12 may be set up as the primary device. Since this device role setting is a matter to be determined between the electronic device 10 and the second external device 12 and all it takes is for the primary device determined according to the device role setting to perform the pairing with the first external device 11, the existence pairing between the electronic device 10 and the first external device 11 is released for now during the multi-point pairing.

As above, the processor 3 may quickly determine the device role by considering the user's input as well as the MAC address, thereby implementing multi-point pairing in accordance with user's intentions.

Figure 8:
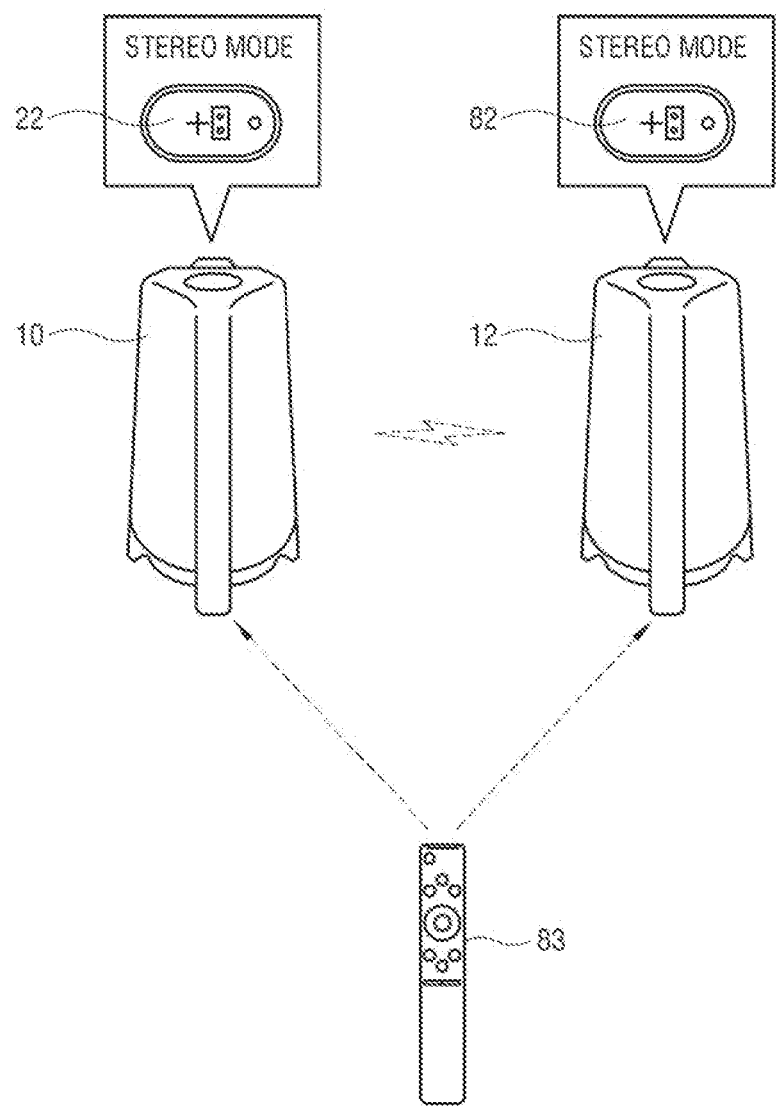
FIG. 8 shows an example of a multi-point pairing event in relation to an operation S31 of FIG. 3.

FIG. 8 shows an example of the multi-point pairing event in relation to the operation S31 of FIG. 3.

As shown in FIG. 8, the electronic device 10 is a device, which implements the single point pairing with the first external device 11, and the second external device 12 is a device, which is newly added to implement the multi-point pairing. Hereinafter, it is assumed that the electronic device 10 and the second external device 12 are Bluetooth® speakers. As discussed above, in an audio outputting device, such as the Bluetooth® speaker or the like, the multi-point pairing may be referred to a stereo group setting or a stereo mode.

The processor 3 may identify whether or not a stereo mode event occurs. The stereo mode event may be received through the user input interface 22 provided in the electronic device 10. The user input interface 22 may be implemented as a physical button for receiving the stereo mode event, but the disclosure is not limited thereto. For instance, according to another embodiment, the user input interface 22 may be implemented through the display 24, which may include a menu for displaying a stereo mode. Moreover, the display 24 may include a touch input for receiving a user input. As another example, the stereo mode event may be based on a signal received an external remote controller 83. These implementation examples may be equally applied to the second external device 12. In other words, the second external device 12 may also include a user input 82 capable of receiving the stereo mode event, and a processor of the second external device 12 may identify whether or not the stereo mode event occurs.

If it is identified that the stereo mode event has occurred in the electronic device 10 and the second external device 12, the processor 3 may perform the Bluetooth® pairing with the second external device 12. In this case, the processor 3 may release the existence Bluetooth® pairing with the first external device 11, and then perform the Bluetooth® pairing with the second external device 12.

As discussed above, the electronic device 10 may identify the multi-point pairing event through the user input 22 or the like, thereby providing convenience to allow the user to more easily implement the multi-point pairing.

Figure 9:
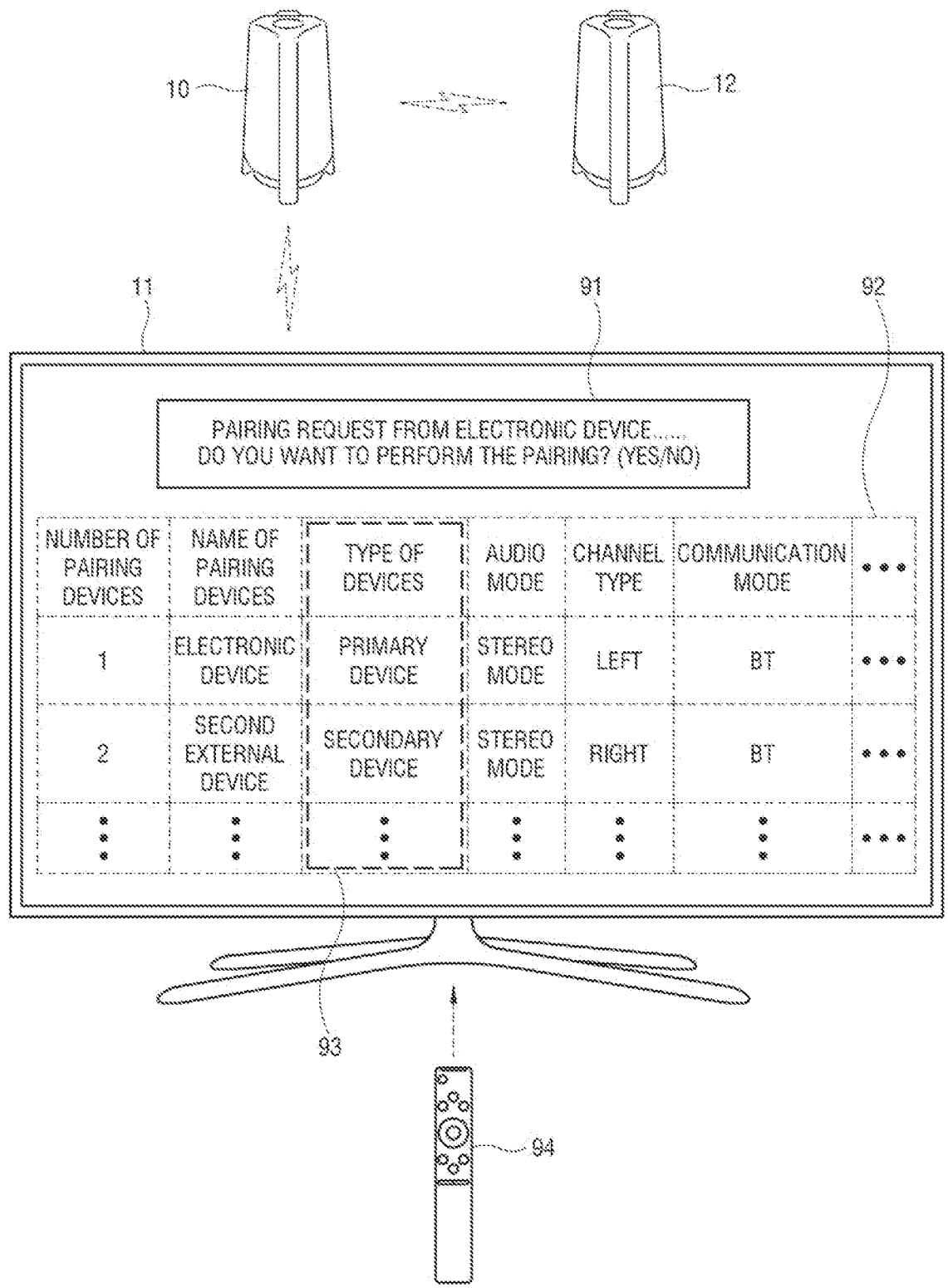
FIG. 9 shows an example of a user interface, which is displayed in a first external device in relation to an operation S34 of FIG. 3.

FIG. 9 shows an example of an user interface, which is displayed in the first external device in relation to the operation S34 of FIG. 3.

As described above, the processor 3 may transmit the information about the primary device to the first external device 11 to perform the pairing therewith. In this case, the first external device 11 may display a first user interface 91 inquiring whether or not to pair with the electronic device 10 thus to allow the user to finally decide whether or not to perform the multi-point pairing. Since in the multi-point pairing, the user may be more interested in whether or not the multi-point pairing is finally accomplished than which device among the electronic device 10 and the second external device 12 is set up as the primary device, the first external device 11 may display the first user interface 91 requesting a final decision for the multi-point pairing.

If the second external device 12 is the primary device, the second external device 12 may transmit the information about the primary device to the first external device 11, and the first external device 11 may display the first user interface 91 inquiring whether or not to pair with the second external device 12.

On the other hand, considering that according to the users, they may be interested in multi-point pairing situations, the first external device 11 may display a second user interface 92 related to the multi-point pairing situations. The second user interface 92 may be displayed simultaneously or separately from the first user interface 91.

The second user interface 92 may include various information about multi-point pairing situations, such as the number of pairing devices, name of pairing devices, type of devices, audio mode, channel type, communication mode, and so on. The type 93 of devices is information about which device is currently set up as the primary device. As described with reference to FIG. 7, if there is a user's input about setting of the primary device, the processor 3 may set up the primary device according to the user's input. The user's input may be received by a remote controller 94 or the like, and the processor 3 may receive information about the user's input from the first external device 1.

On the other hand, the communication mode of the second user interface 92 is information about currently used communication protocol, and the channel type is information about a state, for example, where the electronic device 10, which is the primary device, is set up to output a left channel sound, whereas the second external device 12, which is the secondary device, is set up to output a right channel sound. According to the user's input received through the second user interface 92, the processor 3 may control, for example, the electronic device 10 to output the right channel sound and the second external device 12 to output the left channel sound. Of course, device roles between the two devices may be changed according to the user's input received through the second user interface 92. However, kinds of information included in the second user interface 92 are not limited to those as shown in FIG. 9, and may be provided in a variety of ways according to design methods.

As above, the first external device 11 may display the first user interface 91 to only allow the user to finally confirm the multi-point pairing, thereby improving the convenient for the multi-point pairing. Also, the first external device may display the second user interface 92 to give the discretion about the setting of the multi-point pairing, thereby implementing the multi-point pairing optimized to the user.

Figure 10:
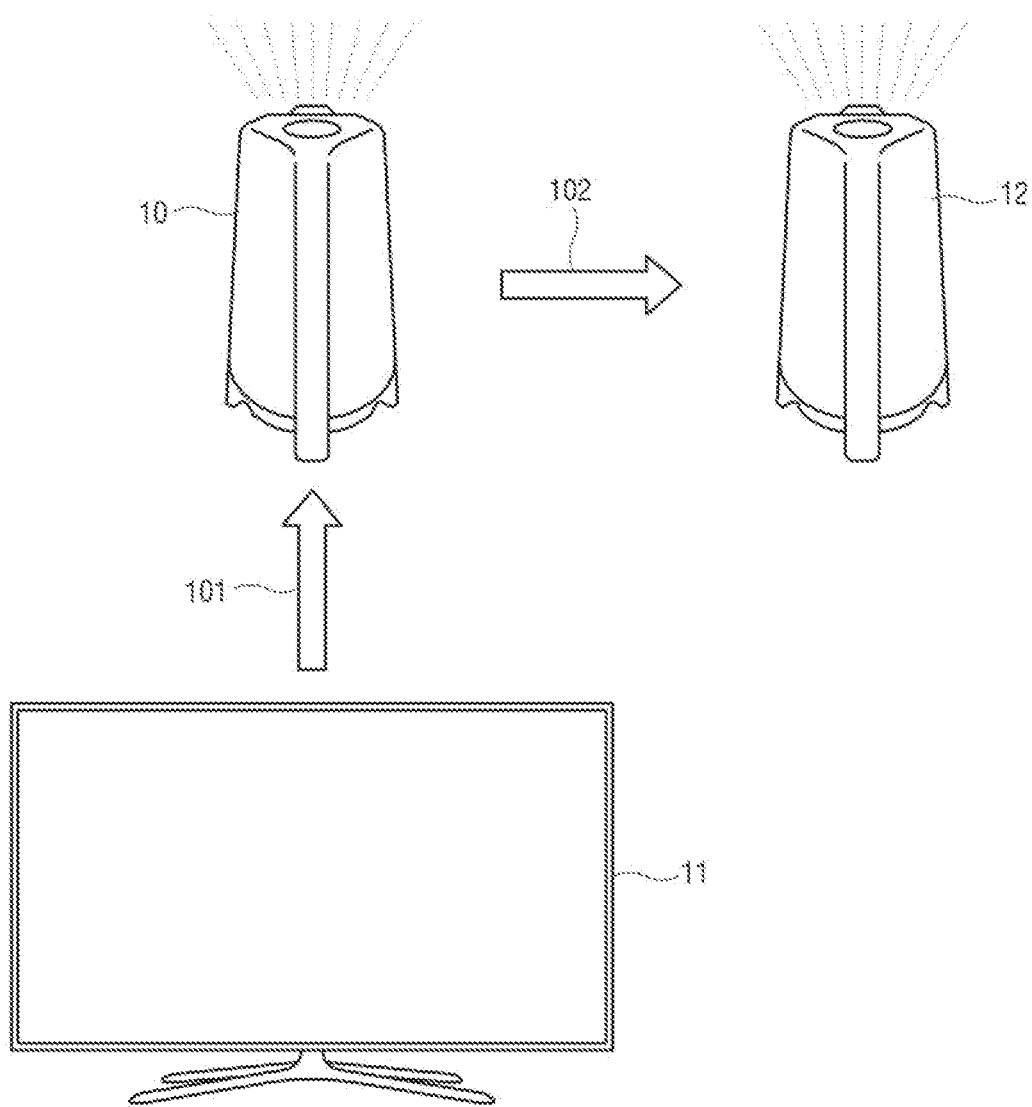
FIG. 10 shows an example of a content data transfer in relation to an operation S35 of FIG. 3.

FIG. 10 illustrates an embodiment of a content data transfer in relation to the operation S35 of FIG. 3.

Hereinafter, in case that the electronic device 10 and the second external device 12 are Bluetooth® speakers, a process of implementing multichannel environments according to the multi-point pairing will be described with reference to FIG. 10.

The processor 3 may receive audio data 101 from the first external device 11. The audio data 101 may include audio data provided according to a plurality of channels. The processor 3 may output audio based on audio data corresponding to a first channel among the received audio data. For example, the first channel may include a left channel.

The processor 3 may transmit audio data 102 corresponding to a second channel among the received audio data to the second external device 12. A processor of the second external device 12 may output audio based on the audio data 102 corresponding to the second channel. For example, the second channel may include a right channel.

However, as described with reference to FIG. 9, since the channel type may be changed according to the user's input, the processor 3 may, for example, output audio based on audio data corresponding to the second channel among the audio data 101 received from the first external device 11, and transmit audio data 102 corresponding to the first channel to the second external device 12, so that the second external device 12 outputs the audio corresponding to the first channel.

As above, the processor 3 may implement the multichannel environments according to the multi-point pairing, thereby improving sense of realism, ambience, immersiveness and the like compared with the single point pairing.

Various embodiments disclosed in the disclosure may be implemented as a software including one or more commands, which are stored in a storage medium readable by a machine, such as the electronic device 10 or the like. The one or more commands may be a program code or instructions to be executed by a processor. As an example, the processor 3 of the electronic device 10 may call the one or more commands from among the stored more than one command from the storage medium, and execute the called one or more commands. This makes it possible to allow the machine, such as the electronic device 10 or the like, to perform at least one function according to the called one or more commands. The one or more commands may include at least one code generated by a compiler or at least one code executable by an interpreter. The storage medium readable by the machine may be provided in a form of non-transitory storage medium. Here, the 'non-transitory storage medium' is a tangible device and means only that it does not include signals (for example, electromagnetic waves), and this term do not distinguish between a case where data is semi-permanently stored in the storage medium and a case where data is temporarily stored therein. For an example, the 'non-transitory storage medium' may include a buffer in which data is temporarily stored.

As an example, methods according to various embodiments described in the disclosure may be provided including in a computer program product. The computer program product according to the disclosure may include the more than one command of the software, which is executed by the processor, as described above. The computer program product may be traded as goods between the seller and the buyer. The computer program product may be distributed in a form of storage medium (for example, CD-ROM) readable by the machine, or distributed (for example, downloaded or uploaded) directly on-line through an application store (for example, Play Store™) or between two user device (for example, smart phones). In case of the on-line distribution, at least some of the computer program product (for example, downloadable application) may be momentarily stored or transitory generated in a storage medium readable by the machine, such as a memory of a server of manufacturer, a server of application store, or a relay server.

Although the embodiments of the disclosure have been illustrated and described above, the disclosure is not limited to the specific embodiments described above, and can be variously modified without departing from the gist of the disclosure claimed in the claims.

The invention claimed is:

1. An electronic device comprising:
an output interface;
a communication interface; and
a processor configured to:
identify an occurrence of a multi-point pairing event for pairing with a second external device through the communication interface, while the electronic device is paired with a first external device,
control the communication interface to release pairing with the first external device and pair with the second external device based on the occurrence of the multi-point pairing event,
set up the electronic device as a primary device for pairing with the first external device,
control the communication interface to transmit, to the first external device, information about the electronic device set up as the primary device to perform re-pairing with the first external device, and
control the output to, based on content data received from the first external device, output content and control the communication interface to transmit the content data to the second external device,
wherein the information about the electronic device set up as the primary device comprises information for the first external device to set up the electronic device as the primary device among from the paired the electronic device or the second external device.

2. The electronic device of claim 1, wherein the processor is further configured to, based on a Media Access Control (MAC) address of the electronic device being identified to be higher than an MAC address of the second external device, set up the electronic device as the primary device.

3. The electronic device of claim 1, wherein the processor is further configured to:
based on a Media Access Control (MAC) address of the electronic device being identified to be lower than an MAC address of the second external device, set up the electronic device as a secondary device, and
control the communication interface to transmit information for setting up the second external device as the primary device to the second external device.

4. The electronic device of claim 1, wherein the processor is further configured to set up the electronic device as the primary device based on a first input from a user designating the electronic device as the primary device.

5. The electronic device of claim 1, wherein the processor is further configured to, based on a pairing standby signal of the first external device being received by the communication interface, control the communication interface to transmit the information about the primary device to the first external device.

6. The electronic device of claim 5, wherein the processor is further configured to:
based on the pairing standby signal of the first external device, control the communication interface to transmit a pairing request signal to the first external device,
receive a pairing acceptance signal corresponding to the pairing request signal from the first external device through the communication interface, and
based on the transmitted information about the primary device, control the communication interface to perform the pairing with the first external device.

7. The electronic device of claim 1, wherein the content data comprises a plurality of content data provided according to a plurality of channels, and
wherein the processor is further configured to:
control the output interface to output a sound based on a first content data corresponding to a first channel among the plurality of channels, and
control the communication interface to transmit, to the second external device, second content data corresponding to a second channel that is different from the first channel.

8. The electronic device of claim 1, wherein the processor is further configured to identify a second input from user selecting a stereo mode as the occurrence of the multi-point pairing event.

9. An electronic device comprising:
a communication interface;
a processor configured to:
control the communication interface to provide content data to a first external device to output content, while the electronic device is paired with the first external device,
based on a pairing with the first external device being released by a pairing event of the first external device and a second external device, control the communication interface to broadcast a pairing standby signal for performing the pairing with the first external device or the second external device,
receive primary device-setting information from the first external device or the second external device through the communication interface,
control the communication interface to, based on the received primary device-setting information, pair with an external device set as a primary device among the first external device and the second external device, and
control the communication interface to transmit the content data to the paired external device,
wherein the primary device-setting information comprises information for the electronic device to set up the external device as the primary device among the first external device and the second external device.

10. A control method of an electronic device, the control method comprising:
identifying an occurrence of a multi-point pairing event for pairing with a second external device, while the electronic device is paired with a first external device;
releasing pairing with the first external device and pairing with the second external device based on the occurrence of the multi-point pairing event;
setting up the electronic device as a primary device for pairing with the first external device;
transmitting information about the electronic device set up as the primary device to the first external device to perform re-pairing with the first external device and receiving content data from the first external device; and
outputting content based on the content data received from the first external device and transmitting the content data to the second external device,
wherein the information about the electronic device set up as the primary device comprises information for the first external device to set up the electronic device as the primary device among from the paired the electronic device or the second external device.

11. The control method of claim 10, wherein the setting up comprises, based on a Media Access Control (MAC) address of the electronic device being identified to be higher than an MAC address of the second external device, setting up the electronic device as the primary device.

12. The control method of claim 10, wherein the setting up comprises:
based on a Media Access Control (MAC) address of the electronic device being identified to be lower than an MAC address of the second external device, setting up the electronic device as a secondary device; and
transmitting information for setting up the second external device as the primary device to the second external device.

13. The control method of claim 10, wherein the setting up comprises setting up the electronic device as the primary device based on a first input from a user designating the electronic device as the primary device.

14. The control method of claim 10, wherein the performing the pairing with the first external device comprises, based on a pairing standby signal of the first external device, transmitting the information about the primary device to the first external device.

15. A control method of an electronic device comprising:
providing content data to a first external device to output content while the electronic device is paired with the first external device;
based on a pairing with the first external device being released by a pairing event of the first external device and a second external device, broadcasting a pairing standby signal for performing the pairing with the first external device or the second external device;
receiving primary device-setting information from the first external device or the second external device;
based on the received primary device-setting information, performing a pairing with an external device set as a primary device among the first external device and the second external device; and
transmitting the content data to the paired external device,
wherein the primary device-setting information comprises information for the electronic device to set up the external device as the primary device among the first external device and the second external device.

16. The electronic device of claim 1, wherein the processor is further configured to set up the electronic device as the primary device, after releasing the pairing with the first external device and after pairing with the second external device.

17. The electronic device of claim 1, wherein the processor is further configured to transmit an event notification to the first external device indicating the occurrence of the multi-point pairing event.

18. The electronic device of claim 17, wherein the processor is further configured to receive a pairing standby signal broadcast by the first external device in response to the event notification indicating the multi-point pairing event.

19. The electronic device of claim 9, wherein the pairing event of the first external device and the second external device is a multi-point pairing event.

20. The electronic device of claim 19, wherein the processor is further configured to receive the primary device-setting information from the first external device or the second external device in response to the pairing standby signal based on the multi-point pairing event.

* * * * *